United States Patent [19]

Morton

[11] Patent Number: 4,934,821
[45] Date of Patent: Jun. 19, 1990

[54] TECHNIQUE FOR SCANNING A MICROFILM IMAGE MOVING AT A VARIABLE SPEED

[75] Inventor: Roger R. A. Morton, Penfield, N.Y.
[73] Assignee: Eastman Kodak Company, Rochester, N.Y.
[21] Appl. No.: 373,845
[22] Filed: Jun. 26, 1989
[51] Int. Cl.⁵ .............................................. H04N 7/18
[52] U.S. Cl. .................................... 358/102; 358/214
[58] Field of Search ............... 358/102, 214, 215, 216, 358/93, 97, 54

[56] References Cited

U.S. PATENT DOCUMENTS

| | | | |
|---|---|---|---|
| 3,755,622 | 8/1973 | Horowitz et al. | 178/7.2 |
| 3,778,545 | 12/1973 | Metzger et al. | 178/7.2 |
| 4,051,458 | 9/1977 | Morton | 340/146.3 |
| 4,205,337 | 5/1980 | Millward | 358/54 |
| 4,266,246 | 5/1981 | Waldron et al. | 358/216 |
| 4,268,865 | 5/1981 | Millward | 358/216 |
| 4,310,856 | 1/1982 | Poetsch | 358/214 |
| 4,356,514 | 10/1982 | Armstrong et al. | 358/214 |
| 4,630,120 | 12/1986 | Childs | 358/214 |
| 4,774,569 | 9/1988 | Morton et al. | 358/102 |
| 4,794,241 | 12/1988 | Carsner et al. | 235/474 |
| 4,807,041 | 2/1989 | Kishi et al. | 358/102 X |

Primary Examiner—James J Groody
Assistant Examiner—Victor R. Kostak
Attorney, Agent, or Firm—Dennis R. Arndt

[57] ABSTRACT

A technique, particularly for use in an image retrieval or image management system, for scanning a succession of microfilm images that moves within a flim transport mechanism at a variable user adjusted speed in order to implement an effective "search" mode of operation. Specifically, this technique relies on operating a CCD scanner at a constant clock rate, e.g. its maximum clock rate, while individual lines in a microfilm image are moving in front of the scanner at a rate that is faster than the integration time of the scanner. As such, the scanner generates a succession of composite lines of pixel data in which each pixel in such a line represents an average value of a corresponding group of vertically adjacent full resolution line spacings situated across an area of the microfilm image, where the number of line spacings in the area equals the value of a ratio of the user controlled speed of the microfilm to the speed of the microfilm when scanned at full resolution. Each composite line of data is then replicated a number of times typically equal to the number of full resolution line spacings in the scanned area associated therewith in order to form an associated group of identical lines of pixel data which, in turn, is stored in successive lines in a frame store memory. The entire contents of the frame store memory are read in succession and applied to a video display terminal to provide a subsequent full size display of the scanned image. Although the invention technique imparts increasing degradation, specifically loss of image resolution, into the displayed image as the (search) speed of the microfilm increases, this degradation is not visible to a human observer inasmuch as the visual acutance of that observer decreases substantially as the speed at which successive images are displayed increases.

34 Claims, 5 Drawing Sheets

| LINE MULTIPLE RATIO | AVAILABLE TIME TO STORE OF EACH IMAGE LINE |
|---|---|
| 1 | ≥ 220μsec |
| 2 | 110-220μsec |
| 3 | 73-110μsec |
| 4 | 55-73μsec |
| 5 | 44-55μsec |

TECHNIQUE FOR SCANNING A MICROFILM IMAGE MOVING AT A VARIABLE SPEED

TECHNICAL FIELD OF THE INVENTION

The invention relates to a technique, particularly for use in electronic image retrieval or image management systems, for scanning a succession of microfilm images that moves in a film transport mechanism at a user adjusted speed in order to implement an effective "search" mode of operation.

BACKGROUND ART

Over the past few years, microfilm has seen increasing use as a medium of choice for compactly storing extremely large amounts of document information. Conventionally, this form of storage relies on optically reducing the size of a page by a substantial amount and then photographically capturing an image of the reduced page on a corresponding frame of microfilm. Each such photographed page may depict a page in a periodical or the like or simply an individual business record, such as a completed business form or the like. Microfilm itself generally takes the form of a roll of developed film that frequently contains a transparency in the form of a strip that contains thousands of successive images all substantially reduced in size.

To read a microfilm image, through for example a manual film reader, an operator first obtains a roll of microfilm that contains the desired image. The operator then inserts that roll into the film reader and then advances a film transport mechanism in the reader to thread an end of the film onto a suitable motor driven take up spool. Once this has occurred, the operator advances the drive mechanism, typically by appropriately turning a control dial to increase the speed of the take up spool to advance the film in a serial fashion until the desired image appears on the screen of the reader. When the desired image is reached, the operator stops the movement of the film, inspects the image, and then often instructs the reader to print a full size hard copy reproduction of the image for later use.

In view of the continuing recognition in the art that microfilm provides an excellent medium for large scale storage of substantial amounts of documentary information, the art is increasing turning to the use of image management systems in an effort to automate the document retrieval process. Such systems are aimed at not only providing an increased throughput of retrieved documents but also providing various capabilities to electronically print and process each retrieved image, such as through image enhancement, rotation, annotation, and the like. In such a system, the same basic sequential process that occurs with a manual reader is used, though in an automated fashion. In particular, a typical image management system incorporates a computer which contains a stored database that possesses an entry (record) for each microfilmed document (microfilm image) stored on the system. For each such document, its corresponding entry contains identifying indicia, such as an abstract or title, of that document and an accompanying microfilm roll and frame number at which an image of that document is stored. Once an operator selects an appropriate document by conducting an on-line computerized search of the database, the computer performs an appropriate database access operation into the record for that document to determine its corresponding roll and frame number. Thereafter, the computer instructs an automated microfilm reader, i.e. a so-called film library also frequently referred to as an "autoloader", to physically retrieve the corresponding roll of microfilm, place it within the reader and then automatically advance the film in that roll until the image of the desired document is reached. Once this image is reached, the reader then electronically scans the image to produce a digitized grey scale representation of the stored document. The digitized image is applied to a local area network to be routed to downstream equipment for storage; image processing, such as enhancement, rotation and/or annotation; display on a video terminal and/or printing.

Oftentimes, a problem frequently occurs with a microfilm based document retrieval system. Specifically, once a roll of microfilm has been advanced to what the operator thought was the proper frame, a wrong document appears on a display screen. In a manual microfilm reader, this problem frequently occurs, because the operator may have simply loaded the wrong roll of microfilm, i.e. a roll that did not contain the desired document, into the reader. The same problem occurs in an image management system if the operator selected the wrong record from the data base or if what was believed to be the correct record actually contains an erroneous entry, i.e. a wrong roll or frame number or document description.

As such, when a wrong document is encountered, the operator of a manual reader will generally attempt to search the roll that exists in the reader in an attempt to locate the particular frame that contains the desired document. Such a search operation, hereinafter referred to as a search mode, frequently involves advancing the microfilm at a relatively fast speed which permits the operator to obtain a very quick glimpse of a full sized image of each document as images of successive frames are sequentially displayed on a display screen of the reader. In this mode of operation, the film is initially advanced at a high speed until the operator believes he or she has reached a section of the film that is likely to contain the desired image at which point the operator appreciably decreases the film advance speed in order to accurately inspect each individual successive frame in that section as it moves past the viewer. Once the desired image is reached, the film advance is terminated. An operator will also undertake a search operation when examination of one document reveals the need for additional information that may be contained in other documents that are stored on nearby prior or succeeding frames of the same roll.

As such, microfilm based retrieval systems need to accommodate a search mode. This can be readily accommodated in a manual reader by merely providing a control that permits an operator to manually vary, i.e. increase or decrease, the speed of the film transport mechanism while successive full sized document images are optically and simultaneously projected on the display screen of the reader.

Unfortunately, providing a search mode is considerably more difficult to implement in an image management system than in a manual reader. Specifically, the optics in a manual reader respond significantly faster than the human eye. As such, the limitation on the speed at which a search mode can be undertaken in a manual reader lies with the operator rather than with the reader itself. By contrast, each microfilm frame that is to be displayed by an image management system must first be electronically scanned into a frame store memory the contents of which, when filled, are then transmitted often in a compressed form over a local area network to a video processor that decompresses the image for subsequent display on a terminal. All these operations impart a finite lag into the response of the system as contrasted with the instantaneous response of the projection optics in a manual reader. To reduce the lag, pipelined operation can occur in which one image is being scanned while all the other operations are occurring for one or more of the images that were just previously scanned in sequence. Unfortunately, image management systems typically utilize a charge coupled device (CCD) imager which requires a finite period of time, the so-called integration time, to provide a satisfactory response for each scanned line. It is principally the integration time that appears to limit the rate at which successive microfilm images can be scanned. For example, assume that the fastest search mode would require the display of 10 successive full sized images/second with a reasonable search mode requiring the display of 5 full sized images/second. In general, a human eye is incapable of distinguishing different images at a rate much in excess of 10 images/second, if that fast. Hence, if a typical microfilm image contains 1000 horizontal scan lines with 4000 pixels/line, then the CCD imager would need to produce output data at a rate of 40M pixels/second to achieve a throughput of 10 images/second. This rate greatly exceeds the pixel clock rate, typically 10 MHz, at which currently available CCD imagers are capable of operating. If the data rate were to be slowed to 10 MHz, then this would limit the search mode to only 2.5 successive images/second which in many instances is simply too slow to allow for an effective search mode.

Although the art does teach various techniques for scanning continuously moving film, particularly for use in a motion picture film to video transfer operation such as that disclosed in U.S. Pat. No. 4,310,856 (issued to D. Poetsch on Jan. 12, 1982); U.S. Pat. No. 4,268,865 (issued to J. Millward on May 19, 1981); U.S. Pat. No. 4,266,246 (issued to C. Waldron et al on May 5, 1981) and U.S. Pat. No. 4,205,337 (issued to J. Millward on May 27, 1980), none of these techniques appears to operate at a sufficiently high resolution required for a microfilm based image management system.

Therefore, a need exists in the art for a technique, particularly one suited for use in an image management system, that permits a succession of full sized microfilm images to be sequentially scanned while the microfilm is moving at a user adjustable speed so as to produce a suitable number of, e.g. upwards of ten, successive full sized images/second on a display screen. Such a technique could be used to advantageously implement a search mode within a microfilm based image management system.

DISCLOSURE OF THE INVENTION

Accordingly, an object of the present invention is to provide a technique that permits a sufficient number of sequentially occurring microfilm images to be separately and successively scanned within a relatively short period of time, e.g. one second, in order to produce a corresponding full sized replication of each such image on a display screen for use in implementing an effective search mode in a microfilm based image management system.

A specific object is to provide such a technique that is designed for use with a CCD imager, such as those typically encountered in a microfilm based image management system.

Another specific object is to provide such a technique that can implement a search mode in an image management system that can provide full size replications of microfilm images at various film speeds up to approximately 10 images/second, if not higher.

These and other objects are accomplished in accordance with the teachings of the present invention by first measuring during search, the duration of the interval of time during which an individual line spacing (at full scanning resolution) of the microfilm image is passing the scanner, illustratively a CCD line scanner. Thereafter, in response to the measured duration, a distance, "n", typically between the value one and ten, of adjacent full resolution image line spacings that occur in the microfilm image and which is to be exposed to the scanner is determined. These adjacent line spacings contain a group of "n" adjacent lines in the microfilm image. Once the value of "n" is determined, then the CCD scanner scans an area defined by "n" adjacent full resolution scan line spacings to form a single line of composite pixel values, wherein the value of each pixel in the composite line is a function, preferably an optical average, of the value of a corresponding pixel in each of the image line spacings that forms the group. This composite line represents the data transmitted from the scanner.

When this composite line is received by a display unit, a group of "m" successive identical lines of pixel values, preferably enhanced thresholded single-bit values, is generated in response to the pixel values that form the composite line. The value of "m" is generally equal to the value of the line multiple ratio, i.e. "n". Once this group of "m" identical lines is generated, this group is then stored in a corresponding area of a display frame store memory and so on for each successive group of "n" adjacent lines in the microfilm image so as to yield corresponding groups of "m" identical lines in the display frame store memory. Alternatively, the data on each of the "m" lines may be position weighted averages between data on successive such lines as outlined in my U.S. Pat. No. 4,051,458. All the resulting groups of "m" identical (or position weighted) lines collectively form a bit-mapped representation of the microfilm image. As the search speed at which the microfilm moves increases, the number of full resolution line spacings that are collectively scanned to form a composite line and the corresponding number of identical lines that are stored within any group in the frame store memory correspondingly increases, which, in turn, reduces the resolution of the bit-mapped image stored in the frame store memory and subsequently displayed on the video display terminal. However, since the visual acutance of a human observer rapidly diminishes as the display time of an image decreases, the observer generally does not perceive any increasing loss in displayed resolution as a sequence of images rapidly changes before him at an increasing search speed.

In particular, a CCD line scanner requires a known finite amount of time, the so-called integration time, to yield a satisfactory response, i.e. to fully integrate the available light for each pixel that exists on a scan line in a microfilm image in order to generate an appropriate analog output value for that pixel which heretofore has principally limited the speed at which successive microfilm images can be scanned.

Now, in accordance with the specific teachings of my invention, the CCD line scanner is operated at a pixel clock rate of illustratively 10 MHz. Depending upon the speed at which the microfilm is moving through a film transport mechanism during a search mode, a microfilm image line will likely move past the CCD line scanner in an interval of time that is significantly shorter than the integration time of the scanner. With my inventive technique, the CCD is permitted to scan a group of full resolution image line spacings that contains "n" successive spacings, generally between one and ten, while the microfilm moves past the scanner in order to generate one composite line of analog pixel data for that group. At the conclusion of this scanning, a line clock pulse is applied to the CCD scanner to instruct it to begin shifting out analog pixel data for this composite line. Due to the integration process undertaken by the CCD scanner, the pixel data for the individual image line spacings in that group will essentially become "averaged" into the analog pixel data for the corresponding composite line. Specifically, each analog pixel value in the composite line generated by the scanner will essentially be an average of the vertically aligned corresponding pixel values in each of the individual image line spacings. The data for this composite line is then used to form a corresponding group of successive lines, usually "n" in number, of identical pixels that are subsequently stored within frame store memory. The actual value of the line multiple ratio is determined in response to the speed at which the microfilm moves through the transport during a search mode.

BRIEF DESCRIPTION OF THE DRAWINGS

The teachings of the present invention may be readily understood by considering the following detailed description in conjunction with the accompanying drawings, in which.

To facilitate understanding, identical reference numerals have been used, where possible, to denote identical elements that are common to various figures.

MODES OF CARRYING OUT THE INVENTION

Figure 1:
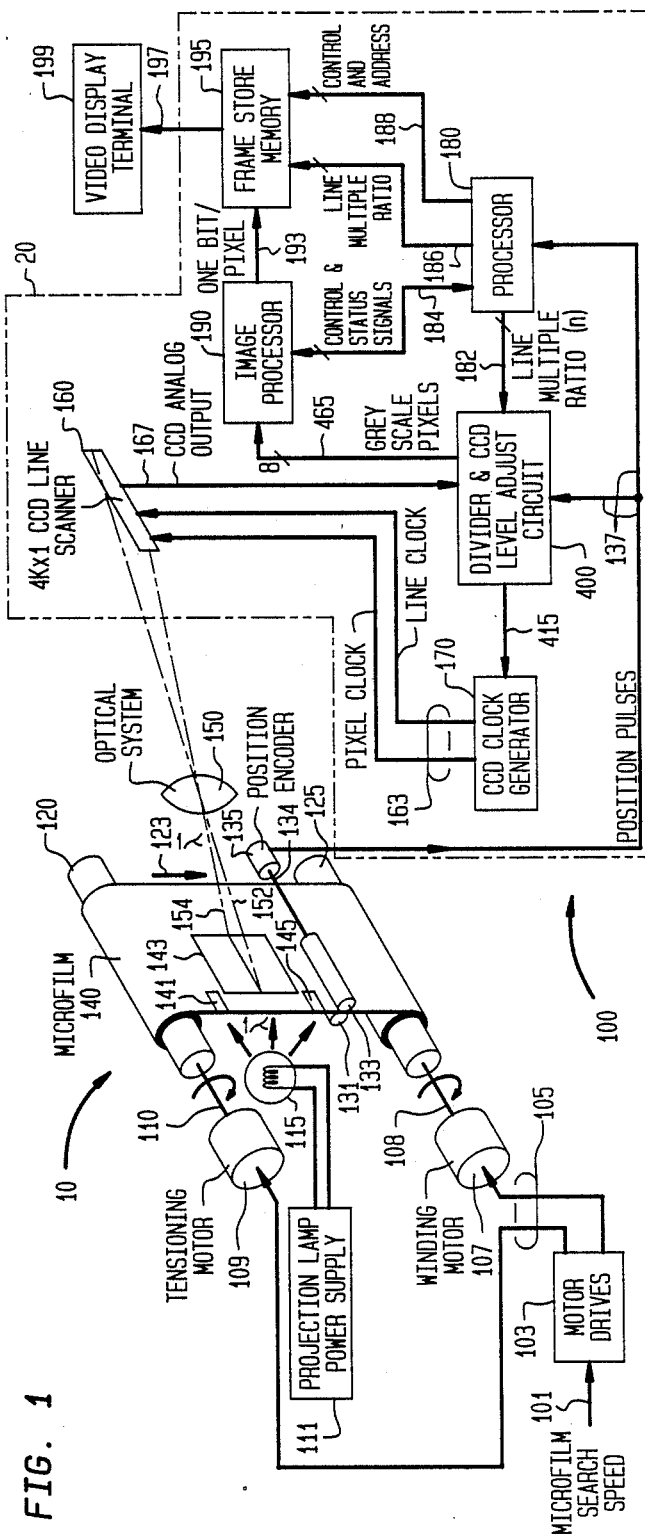
FIG. 1 depicts one embodiment of my inventive microfilm scanning and image processing system.

After reading the following description, those skilled in the art will readily appreciate that my inventive technique can be used in a wide variety of applications for rapidly scanning a succession of discrete images appearing on any of a variety of different media using a scanner, such as a charge coupled device (CCD) imager, that has a finite response time. Now, inasmuch as my inventive technique is particularly suited for use in implementing a "search mode" in a microfilm based image management system that utilizes a CCD line scanner, it will be illustratively discussed in that context.

I have observed that the principal limitation that prevents an effective search mode from being implemented in a microfilm based image management system appears to be the response time of the charge coupled device (CCD) imager used in such a system. In this regard, the CCD imager possesses a certain response time, i.e. the so-called integration time, that limits the speed at which the imager can scan each individual line in a microfilm image. For a typical CCD imager, illustratively having a size of 4000 cells by 1 line (4000-by-1) with an integration time of approximately 200 $\mu$sec, the line scan rate of such an imager is generally limited to approximately 5 KHz. Hence, if a typical microfilm image is to be scanned with such an imager at a full vertical resolution of 5000 horizontal lines, then, no more than 1 full size image/second can be scanned and displayed at this resolution. In fact, owing to other delays in the system, this maximum rate is likely to be somewhat less than 1 image/second. Displaying successive images at this maximum rate is simply too slow for use in implementing an effective search mode of operation in an image management system.

In accordance with the teachings of my invention, an effective search mode, that provides a sufficient display rate of illustratively upwards of 10 full size images/second, can be implemented in scanning microfilm images using a CCD imager in which the CCD imager integrates across a group of "n" successive full resolution line spacings in a microfilm image to provide a corresponding composite scanned line of pixel data which is then replicated within a bit-mapped frame store memory to typically yield a group of "n" identical lines for inclusion in a displayed image, wherein the value of "n" is dictated by the speed at which the microfilm moves through a film transport mechanism of the image management system and particularly the interval of time available to scan each individual full line spacing in that image. This speed is typically set and varied by a user from 0 to a maximum of illustratively 10 images/second in accordance with the specific film speed at which the user undertakes a search. The contents of the frame store memory are then continually applied, on a line-by-line, basis to a video monitor for display which, in turn, provides a full size depiction of each successive microfilm image in sequence.

In this fashion, as the speed of the microfilm increases, a full size image is presented on the display but at a correspondingly decreasing vertical resolution, i.e. a decreasing number of scan lines per frame across the microfilm image are scanned by the CCD imager to yield a single composite line that is itself replicated. This enables the CCD imager to operate at a substantially constant data rate, which for currently available CCD imagers amounts to, for example, a 10 MHz pixel rate and an approximate 2.5 KHz line rate. Although a loss of image resolution will occur and hence the image detail will decrease at increasing search speeds as the direct consequence of use of my technique, the image resulting degradation will ordinarily not be perceived by a user. In particular, the acutance of a human eye, i.e. its ability to accurately recognize detail, substantially decreases as the time during which a particular image is displayed decreases. For example, a human eye is generally unable to differentiate differences in detail between an image containing illustratively 500 uniformly distributed different scan lines out of a total of 1000 available lines in the image when displayed for illustratively 0.25 seconds and the same image containing only 250 uniformly distributed different scan lines out of the same 1000 scan lines when displayed for 0.125 seconds. Although the image displayed for 0.125 seconds contains half the vertical resolution as the same image displayed for 0.25 seconds, the user will likely see no differences in image quality between these images. In fact, whenever an user employs a search mode in a manual microfilm reader, the user is satisfied in being able to distinguish successive images based upon large prominent portions contained within those images (i.e. large visual differences occurring among the images), e.g. the presence of absence of a full page headline in a microfilmed newspaper page, rather than through use of fine image detail, e.g. whether a reported story in that microfilmed page contains a particular textual passage. Even at a significantly reduced image resolution, e.g. 20%, such large image portions will still be quite visible and sufficiently recognizable to the user to provide sufficient visual cues for effective searching. Clearly, if such a user chooses to view a microfilm image in detail, the user will decrease or even totally stop the speed at which the microfilm passes through a film transport mechanism of a manual reader during a search mode to adequately perceive those details of interest in the image.

Hence, inasmuch as my inventive technique provides a response that appreciably matches that of the human eye, i.e. by varying scanned image resolution in inverse proportion to the film speed during a search mode, my technique is able to utilize a CCD imager at a constant scan rate to scan a sufficient number of successive microfilm images to implement an effective search mode in a microfilm based image management system without adversely affecting the quality of the full size images as perceived by a human observer or the utility of searching based upon these scanned images.

In an effort to simplify the drawings, specifically FIGS. 1, 4, 6 and 7, and the ensuing discussion, various well known clocking and control signals and associated control circuitry have been intentionally omitted from the circuitry shown in these figures. After considering the following description of these figures, these signals, their interconnection to the circuit components shown therein and the omitted control circuitry that generates these signals, should be readily and clearly apparent to anyone skilled in the art.

FIG. 1 depicts one embodiment of my inventive microfilm scanning and image processing system, illustratively system 100. As shown, system 100 for inclusion within a microfilm based image management system includes a microfilm transport mechanism, here shown in simplified form as transport 10, circuitry 20 and video display terminal 199. In a search mode, transport 10 moves a strip (web) of microfilm, here shown as microfilm 140, continuously past a CCD imager, specifically CCD line scanner 160 that forms part of circuitry 20, at a speed controlled by a user. The CCD imager collectively scans each group of "n" successive full resolution line spacings in each microfilm image, e.g. image 143, present on the microfilm to yield a composite scanned line of analog pixel values and applies these values to the remainder of circuitry 20. This circuitry, as discussed in detail below, determines which specific line spacings of each microfilm image are to be scanned and appropriately processes the resulting composite scanned lines to generate a full size replication of the microfilm image on video display terminal 199 at a vertical resolution that varies in inverse proportion to the speed of the microfilm. Each image is displayed at a full size of illustratively 1000 lines on monitor 199.

In particular, transport 10 includes supply reel 120 and take-up reel 125. During scanning, a portion of microfilm 140 that has been initially wound on the supply reel is unwound from that reel, in a clockwise fashion, to expose a web portion that travels in a downward direction as shown by arrow 123 and which is subsequently wound on take-up reel 125. When scanning occurs in a forward direction in a search mode, both reels 120 and 125 rotate in clockwise direction at a user selected speed. This speed is set by application of a suitable control voltage appearing on lead 101. This voltage can illustratively be synthesized through a user adjustable potentiometer (well known and not shown) located on the reader that forms part of a microfilm based image management system or more likely through other equipment, such as a digital-to-analog (D/A) converter operating in conjunction with a communications processor (also well known and not shown), that receives and processes commands entered into terminal 199 by a user situated thereat. Inasmuch as none of the communication initiated by the user to the image management system other than the actual film speed setting itself is pertinent to the invention, all other circuitry for generating and processing such communication has been omitted from the figures and is not discussed herein. The voltage for the search speed setting appearing on lead 101 is applied to motor drives 103. These motor drives generate sufficient drive voltage which, when applied through leads 105 to winding motor 107 and tensioning motor 109, cause the armatures of these motors to rotate at an appropriate speed in the clockwise direction to cause microfilm 140 to travel under an appropriate amount of tension from reel 120 to reel 125, in the direction indicated by arrow 123. Motors 107 and 109 are linked by shafts 108 and 110 to reels 125 and 120, respectively. This voltage can also be negative thereby causing the film to be searched in a reversed direction, i.e. opposite to that depicted by arrow 123.

Microfilm 140 contains a succession of two adjacent images, of which only one specific image 143 is shown for simplicity. A microfilm image is typically 1/40th the size of its associated document. Image 143 is scanned on a line-by-line basis by a microfilm scanner and specifically by a CCD imager, such as 4000 pixel linear CCD line scanner 160, located therein. The imager is positioned in the optical path of the microfilm image and is perpendicularly oriented to the direction through which the microfilm moves. Projection lamp 115, powered through projection lamp power supply 111, illuminates microfilm 140 and projects a substantially uniform amount of visible light illumination through the microfilm which, in turn, enters optical system 150. Each cell in the CCD scanner produces an analog output which is proportional to the amount of light falling on a given photosite therein. Each photosite in the scanner produces the analog voltage for only one pixel in a line. During the search mode, microfilm 140 moves past optics 150 in order to expose CCD line scanner 160 to each successive full resolution line spacing in the image. In contrast, for normal line-by-line scanning, the microfilm remains fixed while a scanning mechanism (well known and not shown) moves the CCD vertically downward at a constant speed to traverse through the image on a line spacing by line spacing basis and scan a line in each such spacing. A film blip, such as blip 141 or 145, which appears on microfilm 140 and is situated between every two successive images functions as a framing indicator for use by film positioning circuitry (well known and not shown) to automatically index the microfilm to the start of a desired frame. Microfilm 140 is also threaded between rollers 131 and 133. Roller 133 is linked through shaft 134 to position encoder 135. This encoder, which is typically an optical encoder, provides a pulse on lead 137 as the film moves a pre-defined incremental distance between rollers 120 and 125. As such, the encoder provides a relative output, which if counted, tracks the incremental distance that a microfilm image, e.g. image 143, has moved past the CCD imager relative to a film blip that precedes the beginning of that image, e.g. blip 145, to the film blip that immediately succeeds that image. The frequency of these pulses is proportional to the speed at which the microfilm is moved by transport 10.

As noted, circuitry 20 determines the integration distance 250 (for "n" full resolution line spacings) and also line spacing 251 (see FIG. 2A) along the microfilm image which is to be collectively scanned to yield scan lines of pixel data and then appropriately processes the resulting scanned composite pixel data to generate a corresponding full size image on video display terminal 199, as shown in FIG. 1, at a vertical resolution that varies in inverse proportion to the speed of the microfilm. Specifically, as discussed above, position encoder 135 generates a stream of incremental position pulses on lead 137. These pulses are applied to divider and CCD level adjust circuit 400.

Divider and CCD level adjust circuit 400 performs two distinct functions. First, in a manner to be discussed in detail below, circuit 400 divides the stream of position pulses by a value, specifically the line multiple ratio (n), which has a decimal integer value between "1" and "10" to generate an appropriate stream of synchronizing pulses on lead 415. The value of the line multiple ratio is generated by processor 180 and routed, via loads 182, to circuit 400. Each synchronizing pulse on lead 415 is applied to CCD clock generator 170 which, in synchronism with this pulse, generates a line clock pulse on leads 163 to CCD line scanner 160. As such, each pulse on lead 415 synchronizes CCD line scanner 160 to cease integrating scanned image data and begin shifting out a line of composite analog pixel values on lead 167. CCD clock generator 170 generates appropriate line and pixel clock signals over leads 163 to CCD line scanner 160. A line clock pulse synchronizes the CCD to the start of a composite scanned line; while a pixel clock pulse clocks out an analog value from the CCD for a next successively occurring composite analog pixel value in a current composite scanned line.

Second and totally apart from generating synchronizing pulses on lead 415, circuit 400 digitizes, through an analog-to-digital (A/D) conversion, each analog pixel value produced by CCD line scanner 160 and appearing on lead 167 into an equivalent eight-bit grey scale value. A reference level appearing on lead 461 (see FIG. 4 which will be discussed in detail below) is sent to the A/D converter to compensate for the variations in integration time of each line scan. Each resulting eight-bit grey scale pixel value appears on leads 465.

CCD line scanner 160, as shown in FIG. 1, requires a known finite amount of time, the so-called integration time, to yield a satisfactory response, i.e. to fully integrate the available light for each photosite in the scanner in order to generate an appropriate analog output value for a pixel corresponding thereto. The CCD line scanner operates at its a pixel clock rate of illustratively 10 MHz in response to CCD timing signals previously referred to above and provided by CCD clock generator 170. Accordingly, the CCD scanner is permitted to scan an area, e.g. area 252 (see FIG. 2A) across the microfilm having a height corresponding to "n" (generally between 1 and 10) full resolution image scan line spacings, of which one such line spacing 251 is illustratively shown. This scanning occurs while the film is in motion in order to generate one scanned (composite) line of analog pixel data. The pixel data across the "n" full resolution scan line spacings will essentially become "averaged" by the scanner into pixel data for the scanned (composite) line. The data for this composite line is then used to form a group of "n" successive lines of identical (or vertically position weighted averaged) pixel data within frame store memory 195, as discussed in detail below and so on for subsequently scanned areas, e.g. scanned areas 253 and 254.

The actual value of the line multiple ratio, n, is determined by processor 180, as shown in FIG. 1, in response to the speed at which microfilm 140 moves through transport 10 during a search mode. In particular, processor 180, in response to the position pulses appearing on lead 137, determines the speed at which microfilm 140 is moving during a search mode. This determination may be made by either counting the position pulses that occur during a pre-defined interval of time, such as a fraction of a second, or by measuring the interval of time existing between similar corresponding edges (leading or trailing) of any two adjacent position pulses to determine the period of these pulses. Based upon the determined value of film speed, the processor then, given the maximum number of vertical scan lines (typically "1000" lines) that form the microfilm image, determines the amount of scanning time that is available for CCD line scanner 160 to scan each individual line spacing therein. Having determined the scanning time, the processor then performs a look-up operation into a suitable table, such as table 300 shown in FIG. 3 and which will be discussed in detail shortly, to obtain a corresponding integer value of the line multiple ratio (n). The resulting value of this ratio is communicated as a parallel binary value over leads 182 to circuit 400.

Each eight-bit grey scale digitized pixel value appearing on leads 465 is routed to image processor 190. This image processor processes each eight-bit grey scale pixel value occurring on leads 465 to yield corresponding enhanced thresholded single-bit pixel values on lead 193. Any of a wide variety of specific image processors that provide thresholding and enhancement of multi-bit grey scale pixel values can be used to implement processor 190. For example, image processor 190 may be advantageously formed of the image processing circuit disclosed in my U.S. Pat. No. 4,774,569 issued Sept. 27, 1988 and entitled "Method for Adaptively Masking Off a Video Window in an Overscanned Image" which also provides masking operations for use with overscanned microfilm images. The single-bit output values generated by image processor 190 are applied over lead 193 to frame store memory 195. Leads 184 carry bi-directional communication between image processor 190 and processor 180. Specifically, leads 184 provide various signals to processor 180 that reflect the current status of the operation of the image processor 190. Processor 180 also provides various supervisory control signals over these leads to appropriately control the operation of image processor 190, such as when image processing should be initiated or terminated.

Frame store memory 195 assembles a bit-mapped representation of an image that will subsequently be displayed on video terminal 199. In accordance with my inventive technique, this representation contains successive groups of lines, wherein each group contains "n" identical scan lines. To create this representation, for any group of "n" such lines, the frame store memory stores an associated composite line of single-bit pixel values produced by image processor 190 as the first line in that group. Thereafter, the frame store memory, under control of processor 180, duplicates (copies) the pixel values for that composite line into corresponding bit-map locations for each successive remaining line in that group. The size of this group, in scan lines, is given by the value of the line multiple ratio appearing on leads 186 and generated by processor 180. As a result, a group of "n" lines having identical pixel values is formed in the frame store memory for each scanned area on the microfilm corresponding to "n" adjacent full resolution scan line spacings across the microfilm image, wherein, through integration performed by CCD line scanner 160, the pixel values in each of these "n" stored lines are approximately an average of corresponding pixel values in a area of "n" adjacent full resolution scan line spacings that were scanned across the microfilm image. Processor 180 provides appropriate control, such as read/write, and address signals over leads 188 to frame store memory 195 in order to control its operation. Once an entire image has been assembled within frame store memory 195, the contents of the memory are synchronously read as single-bit digital data and applied over lead 197 to video display terminal 199 in order to visually display the image stored within the memory. In the event that the microfilm is to be searched in an opposite direction, i.e. opposite to that shown by arrow 123, then processor 180 provides suitable addressing information to frame store memory 195 in order to store lines of single-bit pixel data into the frame store memory in a reversed order such that all images accessed from the frame store memory will always be displayed by video terminal 199 with an orientation on the screen of the terminal corresponding to the orientation on the microfilm. Furthermore, processor 180 is also able to provide suitable addressing control to the frame store memory such that reduced size successive images can be stored in different areas of the memory and can subsequently be displayed on a side-by-side or other basis (overlapping or non-overlapping) on video display terminal 199. Alternatively, as previously noted, it is also possible, as described in my U.S. Pat. No. 4,051,458, to fabricate and store a line which represents a spatially weighted vertical position average of successive scan lines in order to present a grey scale image multiple ratio, n, should change from four, then the number of identical lines that form each group, such as groups 205 and 215, will correspondingly change. In this manner, the frame store memory will always contain 1000 lines which, in turn, will produce a full sized image on video display terminal 199 though the vertical resolution of the displayed image will vary as does the value "n".

Figure 3B:
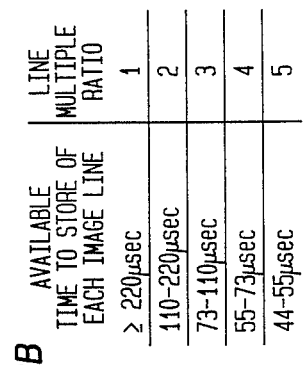
FIG. 3B depicts a table that shows an appropriate value of the line multiple ratio, n, given the amount of time that is available for system 100 shown in FIG. 1 to store each line of a microfilm image.
Figure 3A:
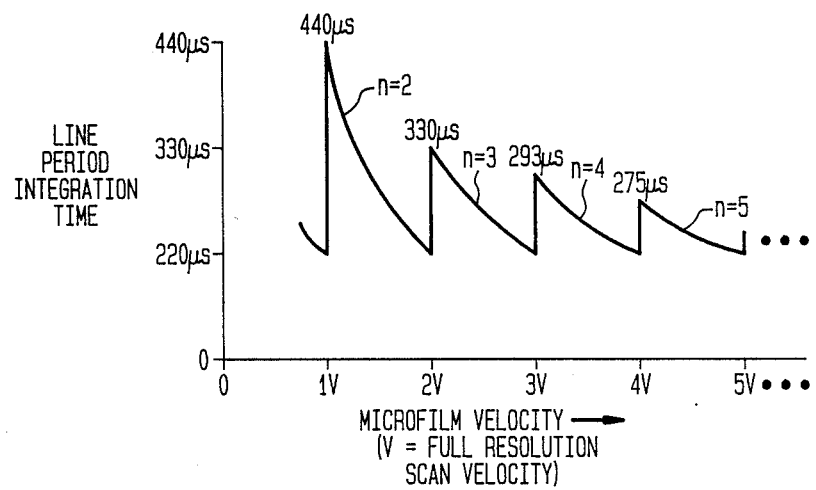
FIG. 3A shows the line period integration time as a function of the velocity of the microfilm for each value of "n" from 1 to 5.

To understand FIG. 3A, assume that CCD scanner 160 is implemented with a 4000-by-1 CCD line scanner, operates at a pixel clock rate of 10 MHz which provides a maximum line rate of 2.5 KHz and has a maximum integration time of 200 $\mu$seconds. As such, the period of time that must be made available to the CCD in order for it to provide a sufficiently large output voltage for each full resolution line spacing in a microfilm image must fall within 200 $\mu$seconds, or for example 220 $\mu$seconds allowing for the width of the line clock pulse. The line scan ratio increases in single integer steps from 1 to 5 as the film speed increases. Within each step, the time available to the CCD scanner to scan each successive line of a microfilm image varies from greater than 200 $\mu$seconds to 200 $\mu$seconds. In this regard, FIG. 3A shows the line period integration time as a function of the velocity of the microfilm for each value of "n" from 1 to 5. The equation governing this function is:

$$\text{LINE PERIOD} = 200 \times n/V \tag{1}$$

where:

V is the ratio of the actual velocity at which the microfilm is scanned to the velocity at which the microfilm would be scanned at full resolution.

The line scan ratio, n, specifies the number of successive full resolution scanned line spacings in the microfilm image having a more continuous appearance than might otherwise occur.

Processor 180 can be implemented in a well-known fashion using any one of a wide variety of currently available digital processing elements, such a microprocessor, and can be programmed in a well known and conventional manner by those skilled in the art to implement the operations set forth above. As such and for the sake of brevity, the hardware and software that forms this processor will not be discussed any further.

Figure 2:
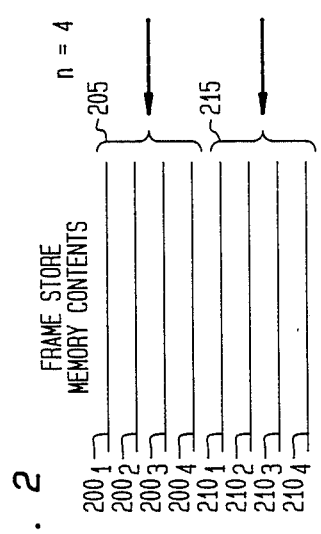
FIG. 2 shows an illustrative correspondence between each composite scanned line produced by system 100 shown in FIG. 1 and a succession of lines stored within frame store memory 195 contained within this system.
Figure 2A:
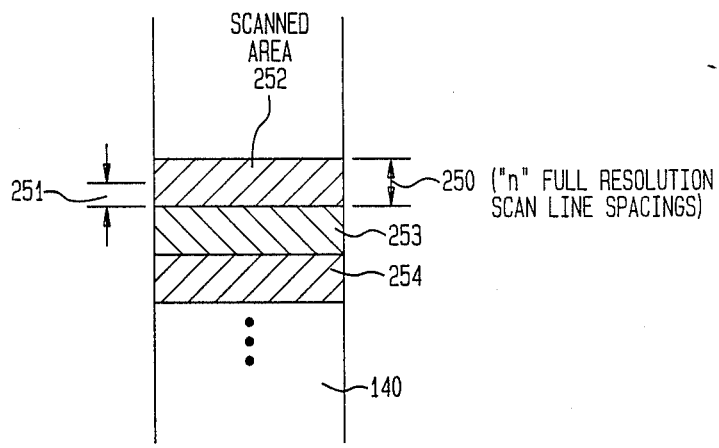
FIG. 2A shows the area that is scanned across the microfilm by each scan line.

FIG. 2 shows an illustrative example of the scan line replication occurring within the frame store memory. In particular, assume that the line multiple ratio, n, equals the value four. It must first be stressed that this number may vary by 1 from line group to line group. Nonetheless, continuing with the example with the line multiple ratio equalling four, then a composite line will be formed for every four successive lines in a microfilm image. As such, if the microfilm image contains 1000 lines, then the image displayed on video display monitor 199 will contain 1000 lines in which every four lines will be identical thereby providing a vertical resolution of 250 different lines. As such, for each group of four adjacent lines stored in the frame store memory for that image, e.g. groups 205 and 215, the first line in the group, e.g. line $200_1$ or $210_1$, respectively, will consist of pixel values for a corresponding composite line, 200 or 210, that was formed by the CCD scanner, while the remaining three corresponding lines in each group, e.g.

lines $200_2$, $200_3$, and $200_4$, and $210_2$, $210_3$ and $210_4$, will contain duplicate pixel values of the first (composite) line in that group. As such, each composite line will cause four identical lines to appear in the frame store memory. If the value of the line scan over which the CCD is allowed to integrate optical pixel data in order to provide a single line of composite pixel data. FIG. 3B depicts illustrative table 300 that knows an appropriate integer decimal value of the line multiple ratio, n, given the amount of time that is available to store each line of a microfilm image in the frame store memory.

Figure 4:
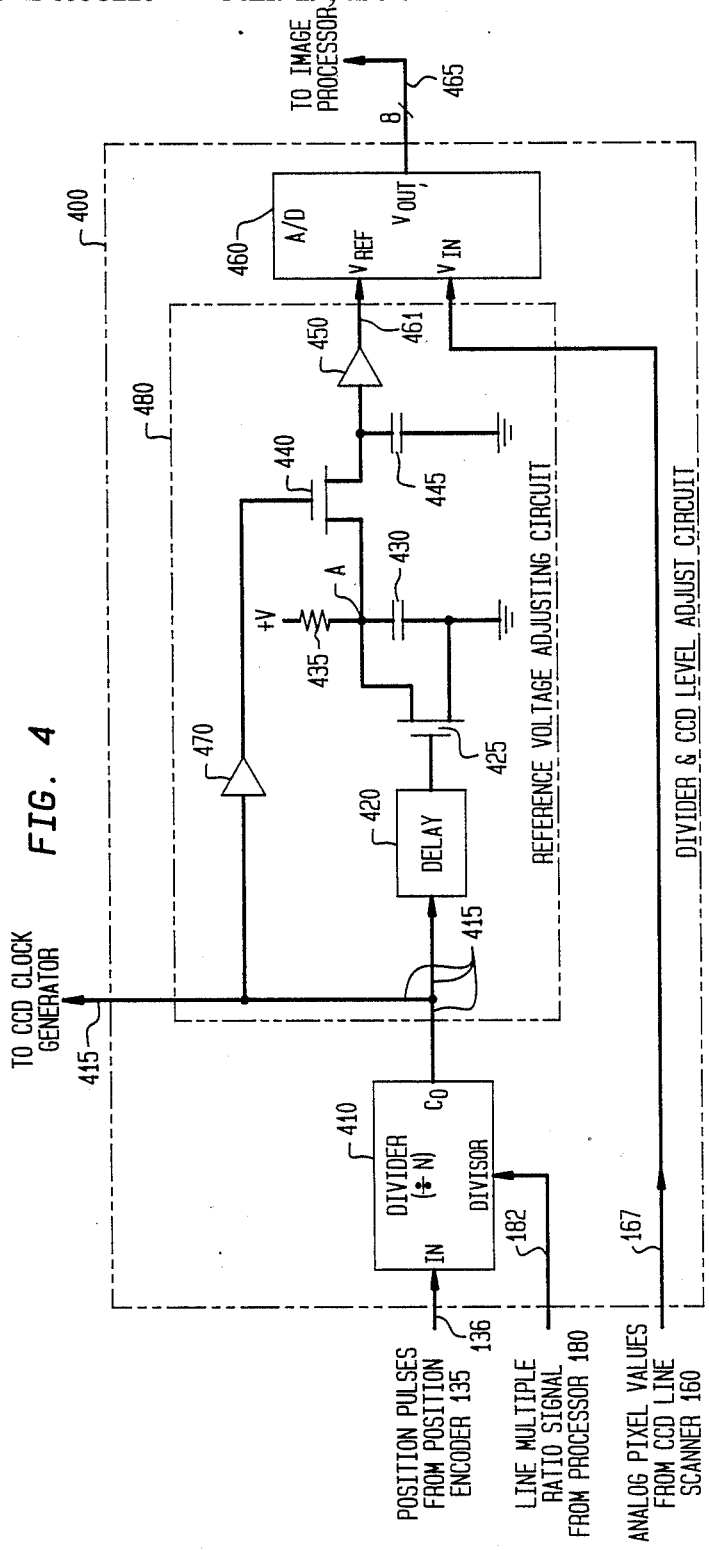
FIG. 4 depicts a block diagram of Divider and CCD Level Adjust Circuit 400 that forms part of system 100 shown in FIG. 1.

Inasmuch as the CCD integration time will vary, the light sensitivity of the CCD will also vary in proportional thereto FIG. 4 depicts a block diagram of divider and CCD level adjust circuit 400 to compensate for this variation and forms part of system 100 shown in FIG. 1. As noted above, this circuit provides two functions: it provides a stream of synchronizing pulses on lead 415 and converts each analog composite pixel value into a corresponding compensated eight-bit digital value.

Specifically, to provide each synchronizing pulse, position pulses from position encoder 135 are applied over lead 136 to divider 410 located within circuit 400. Prior to scanning a microfilm image, this divider is loaded with the value of the line multiple ratio, n, appearing on leads 182 and generated by processor 180. Divider 410 divides the position pulses by the value "n" and applies the resultant divided pulse stream as the synchronizing pulses to lead 415.

Now, with respect to the A/D conversion of the composite analog pixel values, each such analog pixel value is applied from scanner 160, via lead 167, to eight-bit A/D converter 460. The eight-bit output of this converter is applied in parallel to leads 465. A reference voltage, $V_{REF}$, is also applied to A/D converter 460 via lead 461. This reference voltage must be varied because, as the film speed increases (see FIG. 3A) during the search mode of operation, the time that is available to the CCD scanner integrate the pixel data associated with any scan line of the microfilm image will decrease As a result, since each photosite (cell) in the CCD scanner provides an output that is proportional to a time integral of the illumination level to which that photosite is exposed, the maximum value produced by each photosite in the CCD scanner will decrease merely as the result of the reduction in time and regardless of any exposure differences in the microfilm image. As such, the remainder of circuitry 400, i.e. reference voltage adjusting circuit 480 containing delay 420, field effect transistors (FETs) 425 and 440, resistor 435, capacitors 430 and 445 and amplifiers 450 and 470, increase the amplitude of reference voltage $V_{REF}$ appearing on lead 461 in proportion to a change in the integration time interval for the CCD scanner in order to compensate for any change in the analog pixel value that is solely attributable to variations in integration time provided for the CCD scanner. As such, use of a changing reference voltage ensures that a the proper correspondence will occur between digital multi-bit pixel values which converter 460 produces on lead 465 and a given transmission value of the microfilm image whenever the available scanning time for any line therein exceeds the integration time of the CCD line scanner. Once the film velocity falls significantly below the full resolution scan velocity, V, the search mode of operation terminates, at which point the CCD scanning mechanism (not shown as noted above) begins moving at a constant velocity vertically down the image, as discussed above, in order to permit the CCD scanner to accurately scan the microfilm image at a well controlled constant speed. It will be appreciated that other modes of full resolution scan are also possible, for example, by keeping the position of the CCD scanner fixed while the microfilm moves in an accurately controlled manner. The speed at which the CCD scanner moves is chosen to be consistent with the integration time of the CCD scanner.

Figure 5:
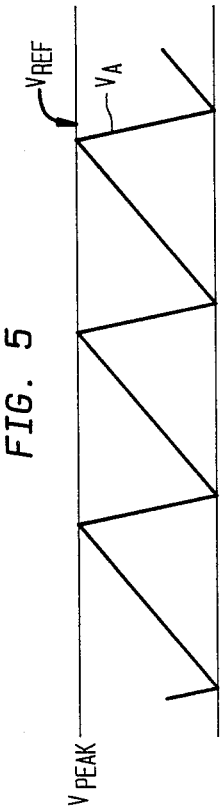
FIG. 5 depicts a typical waveform of voltage $V_{REF}$ that appears within Divider and CCD Level ADjust Circuit 400 shown in FIG. 4.

To understand the operation of reference voltage adjusting circuit 480, assume for the moment that both FETs 425 and 440 are off and capacitors 430 and 445 are both discharged. At this time, capacitor 430 charges through current flowing through resistor 435 thereby causing the voltage appearing across this capacitor to increase. At the instant a synchronization pulse is generated by divider 410 and appears on lead 415, this pulse is amplified by amplifier 470 which provides an output which, routed to the gate of FET 440, turns this FET on. Once this occurs, the voltage appearing on capacitor 430 is sampled and through conducting FET 440 causes the voltage appearing across capacitor 445 to increase to approximately match the voltage appearing on capacitor 430. The value of the capacitance of capacitor 445 is chosen to be smaller than that of capacitor 430 to significantly reduce the charge time of capacitor 445 and minimize the attenuation of voltage transferred to capacitor 445. The voltage appearing on capacitor 445 is applied to an input of amplifier 450 which, in turn, suitably amplifies this voltage and applies a resultant amplified voltage as the reference voltage to the $V_{REF}$ input pin of A/D converter 460. Delay element 420 delays each synchronization pulse by a short finite interval of time. This interval is not critical but is chosen consistent with the width of a synchronization pulse, the minimum period between successive synchronization pulses, the integration time, and the time constant defined by capacitor 430 and resistor 435. At the conclusion of the synchronization pulse, i.e. at its trailing edge, amplifier 470 produces a low level which, when applied to the gate of FET 440, turns this FET off thereby opening an electrical path between capacitors 430 and 445 and effectively decoupling these capacitors. Now, after a short finite interval of time specified by the delay period provided by delay element 420 has elapsed after the leading edge of synchronization pulse on lead 415 has occurred, delay element 420 routes this edge to its output and, in turn, to the gate of FET 425 thereby turning this FET on. Once FET 425 conducts, this FET establishes a relatively high current discharge path across capacitor 430 which quickly reduces the voltage appearing across this capacitor to zero. As such, the voltage, $V_A$, present at node A, i.e. that across capacitor 430, resembles a sawtooth, as shown in FIG. 5. If the delay period is appropriately chosen, then the value of the reference voltage $V_{REF}$ follows the peak value, $V_{peak}$, of the voltage $V_A$. Hence, as the available time period varies with variations in the integration time of the CCD scanner, the level of reference voltage $V_{REF}$ changes in proportion to any such variation to appropriately vary the scaling of A/D converter 460 thereby compensating for variations in CCD sensitivity with varying integration time.

Figure 6:
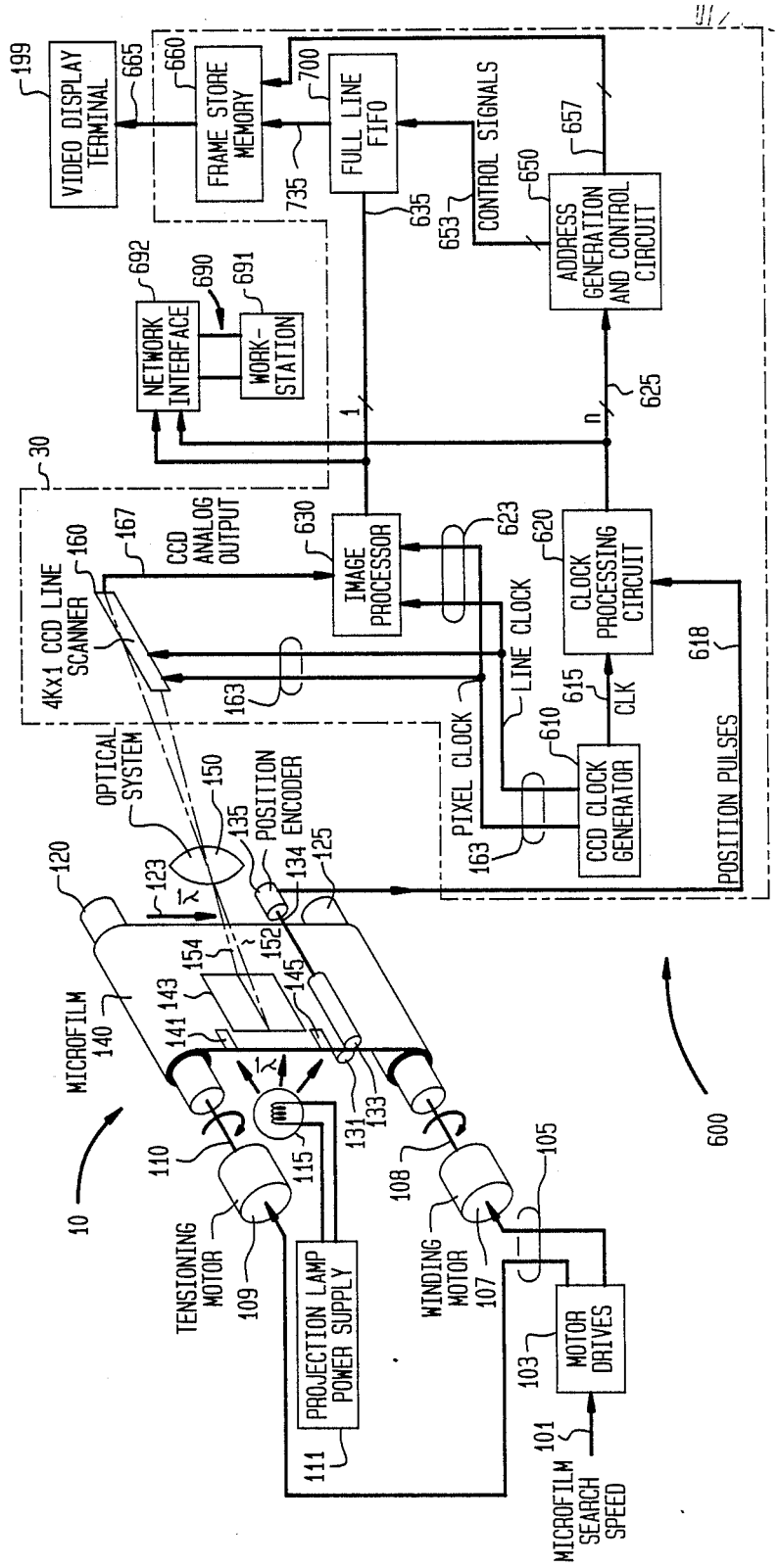
FIG. 6 depicts an alternate embodiment of my inventive microfilm scanning and image processing system.

FIG. 6 depicts an alternate embodiment, specifically system 600, of my inventive microfilm scanning and image processing system. In contrast to system 100 shown in FIG. 1 and discussed above, system 600 continuously and on a free-running basis clocks pixel data from the CCD line scanner at a constant rate, e.g. 10

MHz, but without synchronizing the line clock pulse to the divided position pulses, as occurs at the start of every "nth" line in the microfilm image in system 100. As such, in system 600, the value of the line multiple ratio is no longer constrained to be an integer but rather will assume the value that is equal to the ratio of the speed of the microfilm to the pixel clock rate applied to the CCD scanner, even if this ratio has both integer and fractional components. Inasmuch as system 600 differs from system 100 only in the constituent make-up and operation of circuitry 30 shown in FIG. 6 as contrasted with circuitry 20 shown in FIG. 1, the following discussion will center on the different elements and their operation that form circuitry 30.

Specifically, as shown in FIG. 6, CCD clock generator 610 provides a stream of pixel and line clock pulses over leads 163 which, in turn, route these pulses to CCD line scanner 160 to control its operation. As long as a search mode is being undertaken, CCD clock generator 610 generates these pulses at a constant frequency regardless of the speed of the microfilm or position of the microfilm. The line clock pulses are also applied, via lead 615, to clock processing circuit 620. The position pulses provided by position encoder 135 are routed, via lead 618, to clock processing circuit 620. Circuit 620 divides the line clock pulse stream appearing on leads 163 by the stream of position pulses appearing on lead 618 to determine a ratio therebetween. The resulting value of the line multiple ratio, n, in both integer and fractional (i.e. a remainder) portions is applied in parallel over leads 625 to address generation and control circuit 650 which, in turn, generates appropriate control signals over leads 653 to first-in first-out (FIFO) 700 and appropriate control and address signals over leads 657 to frame store memory 660. Circuit 650 generates a stream of sequentially changing addresses to frame store memory to store either "n" or "n+1" lines of pixel data emanating from FIFO 700 as an appropriate number of identical successive lines in the frame store memory, where the number is dictated by the value of non-integer line multiple ratio n and an accumulating fractional phase error. Alternatively, full line FIFO 700 could be deleted, as in FIG. 1, and circuit 650 (see FIG. 6), through control line 657, could ensure that the data on lead 735 passing directly to frame store memory 660 could be directly replicated in integer($N-\frac{1}{2}$) or integer($N+\frac{1}{2}$) values, depending upon which gives the most accurate results, into consecutive scan lines of memory 660. The choice of whether to use integer($N-\frac{1}{2}$) or integer($N+\frac{1}{2}$) is made such that the Nth line from the CCD scanner falls into a line location in the frame store memory having the line number corresponding to the integer value of $N \times n$. Alternatively, a FIFO could also be used in the embodiment shown in FIG. 1.

Figure 8:
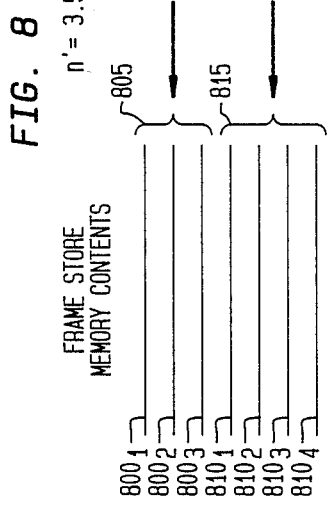
FIG. 8 shows an illustrative correspondence between two successive composite scanned lines produced by system 600 shown in FIG. 6 and two successive groups of lines stored within frame store memory 660 contained within this system.

FIFO 700 stores each line of single-bit enhanced thresholded pixel values provided by image processor 630. As in system 100, each line produced by image processor 630 represents the composite of a group of "n" successive full resolution line spacings of pixel data present in the microfilm image where the group size "n", measured in line spacings, is dictated by the speed at which the microfilm moves through film transport mechanism 10. Once a complete line of single-bit pixel values is stored within FIFO 700, circuit 650 generates appropriate control and addressing signals over leads 657 to repeatedly store that line in a successive number of lines within frame store memory 660 in order to produce the same number of identical lines for subsequent display on video display terminal 199. If the line multiple ratio contains a fractional portion, then address generation and control circuit 650 varies the number of lines that are to form each group, i.e. the number of times each composite line is to be replicated, in a pre-defined pattern within the frame store memory such that the average number of lines in the groups equals the line multiple ratio. For example, if the value of ratio n equals 3.5, then, as shown in FIG. 8, group 805 of three identical lines $800_1$, $800_2$ and $800_3$, is written for one composite scanned line, i.e. line 800; while group 815 of four identical lines, $810_1$, $810_2$, $810_3$ and $810_4$ is written for the next successive composite scanned line, i.e. line 810. This three-four variation repeats as long as the value of ratio "n" remains at 3.5. If the value of this ratio changes, then the number of identical lines written into the frame store memory for every scanned composite line will change accordingly such that the average number of the lines being written within successive groups in the frame store memory tracks and equals the current value of ratio "n". Depending upon the value of the fractional portion of the line multiple ratio, the variation may need to extend over more than two successive groups of identical lines written into the frame store memory. For example, if the line multiple ratio equals 3.33, then three such successive groups would be written into the memory in which the individual groups have three, three and four identical lines so that the average number of lines existing across these three groups equals 3.33. Frame store memory 660 (see FIG. 6) stores a bit-mapped representation of an image to be displayed in substantially the same manner as does frame store memory 195 shown in FIG. 1 and discussed above. Frame store memory 660 can also, as is the case with frame store memory 195, be addressed in a reverse order yet produce a displayed image on terminal 199 with proper orientation so as to accommodate searching microfilm 140 in a reversed direction and/or, if this memory is sufficiently large, store successive images in different areas of the memory for subsequent display on illustratively a side-by-side or other overlapping or non-overlapping basis or in reduced size to ensure that multiple images cover a single field of view on the display screen.

Image processor 630 shown in FIG. 6 contains substantially the same circuitry and provides the same functions as does image processor 190 shown in FIG. 1 and discussed above with the addition of appropriate A/D conversion and with a fixed A/D reference voltage. The pixel and line clock pulses are applied via leads 163 and 623, shown in FIG. 6, to image processor 630 for use in clocking analog pixel data into this processor and appropriately synchronizing its operation to the incoming data.

Figure 7:
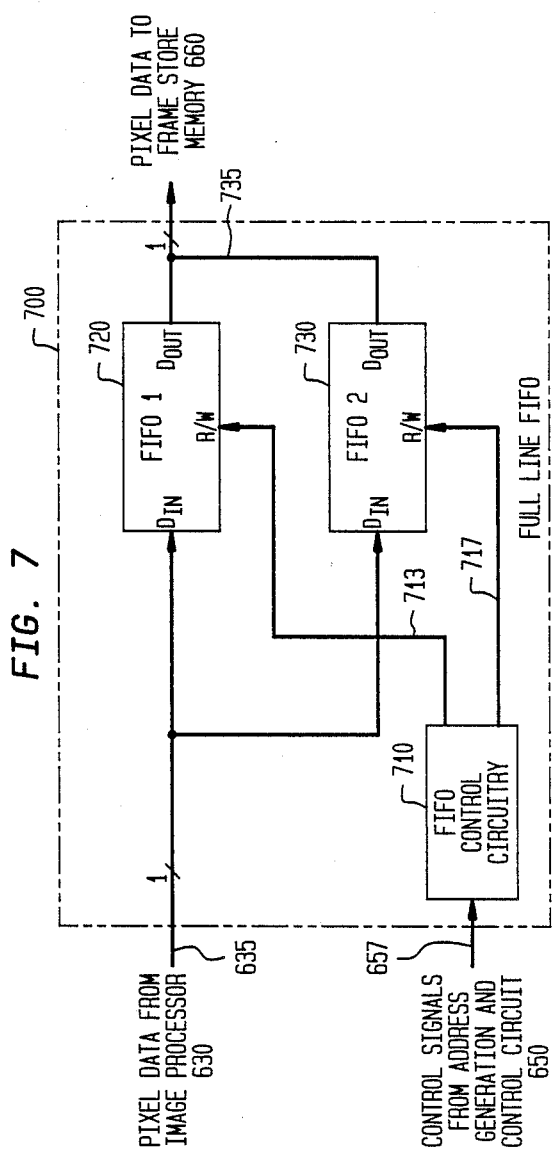
FIG. 7 depicts a block diagram of Full Line FIFO 700 that forms part of system 600 shown in FIG. 6.

FIG. 7 depicts a block diagram of Full Line FIFO 700 that forms part of system 600 shown in FIG. 6. FIFO 700 contains FIFO control circuitry 710 and single line FIFOs 720 and 730. In response to control signals appearing on leads 657 and generated by address generation and control circuit 650 indicating that a line of pixel data is to be written into FIFO 700, control circuitry 710 applies a level change to one of the single line FIFOs, e.g. FIFO 720, over its associated control lead, e.g. lead 713, to the read-write (R/W) input of that line FIFO in order to place that line FIFO into a write mode. At the same time, control circuitry 710 places the opposite level on a control lead, e.g. lead 717, associated with the other line FIFO, e.g. FIFO 730, which when applied to the R/W input of that line FIFO places that line FIFO in a read mode. Consequently, each single-bit pixel value in a line of data appearing on lead 635 is written into FIFO 720. At the same time, under control of circuitry 710, a single line of pixel data existing in FIFO 730 is repeatedly read from this latter FIFO with the resulting output pixel data being applied to output lead 735 which is connected to the data output terminal of both line FIFOs. Once an entire line of pixel data has been written into FIFO 720 and the entire line stored in FIFO 730 has been read an appropriate number of times thereby performing a read-write cycle for FIFO 700, then FIFO control circuitry 710 reverses the operations of line FIFOs 720 and 730, and so on for the next read-write cycle involving FIFO 700.

As previously mentioned, FIFO 700 can be eliminated from system 600 if up to a given number of identical lines of single-bit pixel data (e.g. ten lines)—with the actual number depending on the integer portion of line multiple ratio n, could be generated by image processor 630 with vertically aligned (or otherwise corresponding) pixel values being synchronously and simultaneously written into the same number of lines within the bit-map stored within the frame store memory. In this instance, the structure of frame store memory 660 would need to be suitably changed to accommodate writing of multiple lines of incoming pixel data.

In addition, the inventive technique could be used to reduce the bandwidth of a network connecting a remote workstation at which a succession of images is to be presented. In this case, workstation 691 would connect to network 690 (see FIG. 6) and would be driven by network interface 692 to send scanned data appearing on line 635 (which may or may not be compressed) to workstation 691 along with appropriate timing and control signals from line 625.

By now, those skilled in the art clearly realize that even though the invention is described in terms of a line scanner that remains fixed and a microfilm image that moves, the inventive technique is equally applicable in those situations where the scanner moves at an increased rate of speed relative to the image. In this situation, the image could remain fixed or move at a slower speed relative to the scanner. In fact, the inventive technique is applicable wherever there is a relative speed difference between the film and the scanner such that the scanner is not provided with a sufficient amount of time, i.e. its integration time, to fully scan each individual line in the image.

Furthermore, although the number of identical lines written into the frame store memory has been described as always or on the average equalling the value of the line multiple ratio, n, the number, "m", of such identical lines written into this memory for each composite line produced by the CCD line scanner is not necessarily limited to the value of the line multiple ratio. In fact, the number, "m", can be set to be greater than the line multiple ratio in those instances where a display is used that is capable of displaying more lines, e.g. 2000, than that produced by scanning a microfilm image, e.g. 1000. For example, if a 2000 line display is used to depict a 1000 line microfilm image, then the value of "m" can be set to equal twice the line multiple ratio.

Moreover, even though the invention has been specifically described in terms of implementing a search mode in an image management system wherein successively occurring microfilm images contained on a strip of microfilm are scanned by a CCD line scanner as the film moves through an associated film transport mechanism at a user adjusted speed, the inventive technique can be used to implement such a search mode in other image processing systems in which a sequence of discrete images is to be electrically scanned in a relatively short interval of time by a raster based scanner that has a finite response time that is longer than the time available for that scanner to completely scan pixels associated with a line of data in any one discrete image. The media that contains the image is not limited to being microfilm, but instead can be substantially any media, such as illustratively paper or a plastic film, on which an image can be printed by illustratively photographic or other techniques. For example, such a system might include a high speed optical character reader that contains a CCD imager. Though, as noted above, use of the inventive technique increasingly reduces the resolution of corresponding displayed images as the search speed increases, this loss is more than offset by a correspondingly increasing loss in visual acutance of an observer who undertakes a search operation at increasing search speeds and views a resulting sequence of rapidly changing displayed images.

Although various embodiments of the present invention have been shown and described in detail herein, many other different embodiments that incorporate the teachings of the invention may be easily constructed by those skilled in the art.

INDUSTRIAL APPLICABILITY AND ADVANTAGES

The present invention is useful in an image management system and generally in any system that relies on electronically retrieving stored images from microfilm. Use of the invention in such a system advantageously permits a successive number of microfilm images to be sequentially scanned in a relatively short period of time as the microfilm moves at a user adjustable speed through a transport mechanism that forms part of the system. As such, the invention can be used to implement a search mode of operation in such a system. Inasmuch as this mode of operation has generally been previously unavailable in such microfilm based systems known in the art, use of the invention advantageously increases the utility of these systems.

I claim:

1. A method for scanning at a variable resolution a visual depiction of a discrete image portion moving at a defined speed and for forming a bit-mapped representation of the image portion in a frame store memory, the method comprising the steps of:

measuring a duration of an interval of time during which the image portion moves a pre-determined distance past a scanner;

determining, in response to the measured duration, a first number of adjacent full resolution image line spacings in an area in said image portion that are to be exposed to the scanner;

scanning said area to form a line of composite pixel values, wherein the value of each pixel in said composite line is a function of the value of a corresponding full resolution pixel occurring across said area;

generating, in response to the pixel values in said composite line, a group having a second number of successive lines of pixel values; and storing the group of lines of pixel values in a corresponding area of a frame store memory.

2. The method in claim 1 further comprising the step of repeating said scanning, generating and storing steps for successive groups of adjacent full resolution line spacings in additional image portions so as to form corresponding groups of lines of pixel values in said frame store memory whereby all the groups of lines in said frame store memory which collectively form a stationary bit-mapped representation of a complete image at a resolution equal to or less than that of said image and at a size which is substantially independent of the speed at which the image is moving.

3. The method in claim 2 wherein said function is the average of the values of all corresponding pixels in the area containing said first number of full resolution image line spacings.

4. The method in claim 3 wherein said generating step comprises the steps of:
producing, in response to said pixel values, a second line of digitized pixel values as a given line in said group of lines, and
replicating, by position weighted interpolation, said second line to form remaining lines in said group.

5. The method in claim 3 wherein said generating step comprises the steps of:
producing, in response to said composite pixel values, a single line of digitized pixel values as a first line in one of the groups of lines; and
replicating the single line of digitized pixel values to yield the one group containing identical lines of pixel values.

6. The method in claim 5 wherein said single line producing step comprises the step of converting each analog pixel value on said line of composite pixel values into a corresponding multi-bit digital composite pixel value.

7. The method in claim 6 wherein said scanner comprises a CCD line scanner.

8. The method in claim 7 further comprising the step of establishing a relative velocity between the image portion and the scanner while said scanner generates said composite line so that the individual line in said image portion is exposed to the scanner.

9. The method in claim 8 wherein the values of the first and second numbers are equal.

10. The method in claim 8 further comprising the step of maintaining the scanner in a fixed position relative to the image and continuously moving the image past the scanner at a pre-selected search speed during a search mode of operation.

11. The method in claim 8 wherein said analog pixel converting step comprises the step of varying an analog reference voltage used by an analog to digital converter that converts each analog pixel value to multi-bit digital form in response to an amount that the duration of said interval of time exceeds an integration time of said scanner so as to vary a scale factor of said converter thereby maintaining a proper correspondence between a maximum digital multi-bit pixel value produced by said converter and a given maximum amount of exposure in a pixel in said image as said duration increases beyond said integration time.

12. The method in claim 8 wherein said measuring step comprises the steps of:
producing position pulses as said image incrementally moves with respect to said scanner; and
determining, in response to said position pulses, the duration of time during which said individual line in said image portion is exposed to said scanner;
and said first number determining step comprises the step of:
performing, in response to said first number, a table-look up operation to obtain a value of a line multiple ratio;
and said scanning step comprises the step of:
generating a line clock pulse for application to said CCD scanner in response to dividing the stream of position pulses by the value of the line multiple ratio.

13. The method in claim 12 further comprising the step of maintaining the scanner in a fixed position relative to the image and continuously moving the image past the scanner at a pre-selected search speed during a search mode of operation.

14. The method in claim 13 wherein said image is a microfilm image and said method further comprises the step of displaying said bit-mapped representation on a video display terminal.

15. The method in claim 14 wherein the values of the first and second numbers are equal.

16. The method in claim 14 wherein said single line producing step further comprises the step of processing each multi-bit digital composite pixel value on said composite line to yield a corresponding line of enhanced and thresholded single-bit pixel values as said single line of processed pixel values.

17. The method in claim 14 wherein said analog pixel converting step comprises the step of varying an analog reference voltage used by an analog to digital converter that converts each analog pixel value to multi-bit digital form in response to an amount that the duration of said interval of time exceeds an integration time of said scanner so as to vary a scale factor of said converter thereby maintaining a proper correspondence between a maximum digital multi-bit pixel value produced by said converter and a given maximum amount of exposure in a pixel in said microfilm image portion as said duration increases beyond said integration time.

18. The method in claim 8 wherein said scanning step comprises the steps of:
applying line and pixel clock pulses that occur at corresponding pre-defined rates to the CCD scanner;
producing position pulses as said microfilm image portion incrementally moves with respect to said scanner;
dividing the position pulses by the line clock pulses to provide the value of the line multiple ratio; and
varying the value of said second number, in accordance with a fractional portion of the line multiple ratio, between one group of identical lines of pixel values and at least one successive such group of identical lines of pixel values such the average number of identical lines of pixel values over which said variation occurs substantially equals the line multiple ratio.

19. The method in claim 18 further comprising the step of maintaining the scanner in a fixed position relative to the image and continuously moving the microfilm image portion past the scanner at a pre-selected search speed during a search mode of operation.

20. The method in claim 19 wherein said image is a microfilm image and said method further comprises the step of displaying said bit-mapped representation on a video display terminal.

21. The method in claim 20 wherein the values of the first and second numbers are equal.

22. The method in claim 20 wherein said single line producing step further comprises the step of processing each multi-bit digital composite pixel value on said composite line to yield a corresponding line of enhanced and thresholded single-bit pixel values as said single line of processed pixel values.

23. The method in claim 20 wherein said analog pixel converting step comprises the step of varying an analog reference voltage used by an analog to digital converter that converts each analog pixel value to multi-bit digital form in response to an amount that the duration of said interval of time exceeds an integration time of said scanner so as to vary a scale factor of said converter thereby maintaining a proper correspondence between a maximum digital multi-bit pixel value produced by said converter and a given maximum amount of exposure in a pixel in said microfilm image portion as said duration increases beyond said integration time.

24. Apparatus for scanning at a variable resolution a visual depiction of a discrete image portion moving at a defined speed and for forming a bit-mapped representation of the image portion in a frame store memory, the apparatus comprising:
   means for measuring a duration of an interval of time during which the image portion moves a pre-determined distance past a scanning means;
   means for determining, in response to the measured duration, a first number of adjacent full resolution image line spacings in an area in said image portion that are to be exposed to the scanning means;
   said scanning means for scanning said area to form a line of composite pixel values, wherein the value of each pixel in said composite line is a function of the value of a corresponding full resolution pixel occurring across said area;
   means for generating, in response to the pixel values in said composite line, a group having a second number of successive lines of pixel values; and
   means for storing the group of lines of pixel values in a corresponding area of a frame store memory.

25. The apparatus in claim 24 wherein said function is the average of the values of all corresponding pixels in the area containing said first number of full resolution image line spacings.

26. The apparatus in claim 25 wherein said generating means comprises:
   means for producing, in response to said pixel values, a second line of digitized pixel values as a given line in said group of lines, and
   means for replicating, by position weighted interpolation, said second line to form remaining lines in said group.

27. The apparatus in claim 26 wherein said generating means comprises:
   means for producing, in response to said composite pixel values, a single line of digitized pixel values as a first line in one of the groups of lines; and
   means for replicating the single line of digitized pixel values to yield the one group containing identical lines of pixel values.

28. The apparatus in claim 27 wherein said single line producing means comprises means for converting each analog pixel value on said line of composite pixel values into a corresponding multi-bit digital composite pixel value.

29. The apparatus in claim 28 wherein said scanning means comprises a CCD line scanner.

30. The apparatus in claim 29 further comprising means for establishing a relative velocity between the image portion and the scanner while said scanner generates said composite line so that the individual line in said image portion is exposed to the scanner.

31. The apparatus in claim 30 wherein the values of the first and second numbers are equal.

32. The apparatus in claim 30 further comprises means for maintaining the scanner in a fixed position relative to the image and continuously moving the image past the scanner at a pre-selected search speed during a search mode of operation.

33. The apparatus in claim 30 wherein said analog pixel converting means comprises:
   an analog to digital converter for converting each analog pixel value to multi-bit digital bit form; and
   means for varying an analog reference voltage used by the analog to digital converter in response to an amount that the duration of said interval of time exceeds an integration time of said scanner so as to vary a scale factor of said converter thereby maintaining a proper correspondence between a maximum digital multi-bit pixel value produced by said converter and a given maximum amount of exposure in a pixel in said image as said duration increases beyond said integration time.

34. The apparatus in claim 30 wherein said measuring means comprises:
   means for producing position pulses as said image incrementally moves with respect to said scanner; and
   means for determining, in response to said position pulses, the duration of time during which said individual line in said image portion is exposed to said scanner: and said first number determining means comprises:
   means for performing, in response to said first number, a table-look up operation to obtain a value of a line multiple ratio;
   and said scanning means comprises:
   means for generating a line clock pulse for application to said CCD scanner in response to dividing the stream of position pulses by the value of the line multiple ratio.

* * * * *

UNITED STATES PATENT AND TRADEMARK OFFICE
CERTIFICATE OF CORRECTION

PATENT NO. : 4,934,821

DATED : June 19, 1990

INVENTOR(S) : Roger R.A. Morton

It is certified that error appears in the above-identified patent and that said Letters Patent is hereby corrected as shown below:

Column 18, lines 63-64, change "value of a corresponding full resolution pixel" to --values of corresponding pixels in the full resolution line spacings--;

Column 21, line 38, change "value of a corresponding full resolution pixel" to --values of corresponding pixels in the full resolution line spacings--.

Signed and Sealed this

Eighth Day of December, 1992

Attest:

DOUGLAS B. COMER

Attesting Officer

Acting Commissioner of Patents and Trademarks